(12) United States Patent
Mykkanen

(10) Patent No.: US 6,592,765 B1
(45) Date of Patent: Jul. 15, 2003

(54) METHOD AND DEVICE FOR COLLECTING OIL MIXED WITH ICE BLOCKS

(75) Inventor: Erkki Mykkanen, Espoo (FI)

(73) Assignee: Suomen Ymparistokeskus, Helsinki (FI)

(*) Notice: Subject to any disclaimer, the term of this patent is extended or adjusted under 35 U.S.C. 154(b) by 0 days.

(21) Appl. No.: 09/936,229

(22) PCT Filed: Mar. 13, 2000

(86) PCT No.: PCT/FI00/00195
§ 371 (c)(1),
(2), (4) Date: Sep. 12, 2001

(87) PCT Pub. No.: WO00/53488
PCT Pub. Date: Sep. 14, 2000

(30) Foreign Application Priority Data

Mar. 11, 1999 (FI) .................................................. 990540

(51) Int. Cl.[7] .............................................. E02B 15/04
(52) U.S. Cl. ........................ 210/747; 210/776; 210/785; 210/170; 210/242.3; 210/389; 210/923
(58) Field of Search ................................. 210/747, 776, 210/785, 170, 242.3, 388, 389, 923

(56) References Cited

U.S. PATENT DOCUMENTS

| | | | | |
|---|---|---|---|---|
| 3,838,775 A | * | 10/1974 | Larsson | 210/242.3 |
| 3,959,136 A | * | 5/1976 | Ayers et al. | 210/242.3 |
| 4,039,454 A | | 8/1977 | Miller et al. | 210/242.3 |
| 4,053,406 A | * | 10/1977 | Deslauriers et al. | 210/242.3 |
| 4,356,094 A | * | 10/1982 | Ross | 210/776 |
| 4,747,361 A | * | 5/1988 | Lundin | 210/242.3 |
| 4,831,955 A | * | 5/1989 | Lundin | 210/242.3 |
| 4,976,855 A | * | 12/1990 | Virtanen | 210/923 |
| 5,469,645 A | * | 11/1995 | Aiken | 210/923 |

FOREIGN PATENT DOCUMENTS

| | | |
|---|---|---|
| DE | 197 17202 | 10/1998 |
| FI | 80746 | 3/1990 |
| SE | 450242 | 6/1987 |
| SU | 1592443 | 9/1990 |

\* cited by examiner

*Primary Examiner*—Christopher Upton
(74) *Attorney, Agent, or Firm*—Young & Thompson

(57) ABSTRACT

A method and a device for separating oil from ice. In the method, ice is pressed under the water along an inclined surface formed by a bar screen (3) or a grating. The oil is separated from the ice by vibrating the inclined surface formed by the bar screen (3).

10 Claims, 2 Drawing Sheets

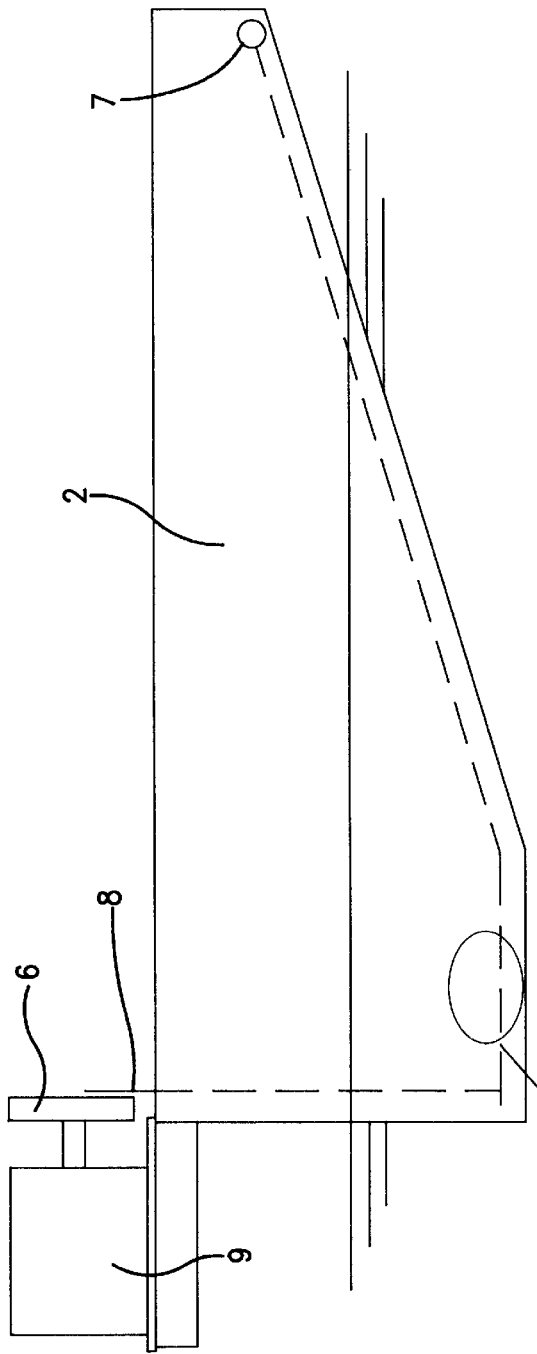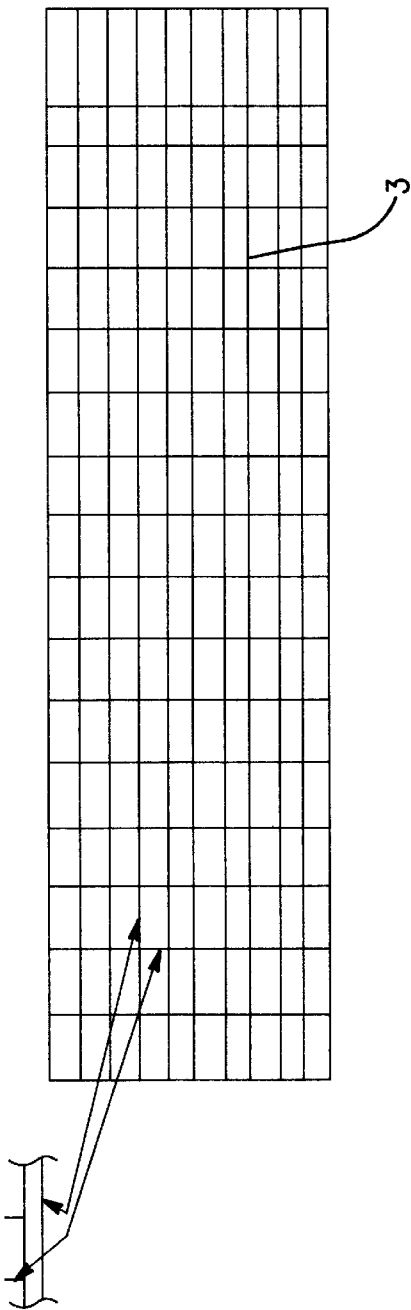

METHOD AND DEVICE FOR COLLECTING OIL MIXED WITH ICE BLOCKS

BACKGROUND OF THE INVENTION

The objective of the invention is a method and a device for collecting oil mixed with ice blocks.

As a consequence of ships striking a rock, colliding or equipment failure, oil can get into the water. Collecting oil from water is especially difficult when the water is partly or fully covered by ice. The situation is particularly difficult when the oil is in a broken ice field, such as a fairway. In that case, oil is not only on the lower surface of the ice, but also mixed with the ice blocks and trash ice and, to some extent, even on top of the ice. Collecting oil from ice blocks by using the equipment on the market has not been efficient enough. The state of the art recognizes a low-gradient plane that pushes ice blocks under the surface of the water; as a result, part of the oil comes off, and the dispersed oil can be recovered by using various methods.

Patent publication FI 80746 describes an application on board a vessel to collect oil from among ice blocks. The application comprises a bow member with a low gradient, planar lower surface that is provided with intake openings for water containing impurities. When the vessel moves forward, ice blocks are submerged below the surface and are washed at the same time. According to the publication, intensive waterjets can enhance washing. The bow is a part that is separate from the actual body of the vessel and it can be lifted and lowered to achieve optimal driving conditions.

Patent application FI 73029 describes a method for collecting oil from a water level covered with ice. In the method, if needed, ice is broken into small enough pieces so that they can be submerged below the water level by using the equipment available. Oil, that comes off the ice blocks by washing with water streams that are generated by submerging the ice blocks, is recovered.

Patent application U.S. Pat. No. 4,039,454 describes a device for separating oil from water and floating ice blocks. This device also comprises an inclined plane that forces the ice blocks under water. The plane consists of a grating through which the oil can rise and be transferred to the collection equipment. Oil is removed from ice blocks when the ice blocks are submerged under the water.

Patent publication FI 75014 describes an application on board a vessel for collecting oil from among ice blocks. The lower surface of the vessel bow is low-gradient so that, when the vessel moves forward, ice blocks are submerged under the water, simultaneously being washed by the water. The lower surface of the inclined plane comprises bristles that sweep the upper surfaces of the ice blocks. The lower surface of the plane comprises water intake openings and the oil is separated from the water inside the vessel. The water that is pumped out is sprayed on the ice blocks from which the oil is to be removed.

In prior art solutions, the separation of oil from the ice blocks is solely based on the buoyant force of oil in relation to water, when ice blocks are forced under the water level. This separation method is not efficient and the majority of the oil remains attached to the ice blocks. By using the method and the equipment according to the invention, oil can be removed from ice blocks considerably more efficiently than before.

SUMMARY OF THE INVENTION

The objective of the invention is a method for separating oil from ice blocks, comprising forcing the ice blocks under the water along an inclined surface formed by a bar screen or a grating attached to the vessel. The method is characterized in that oil is separated from ice blocks by vibrating the inclined surface formed by the bar screen. Vibrating is preferably effected in an essentially vertical direction. The pounding movement of the bar screen now drives the ice downward and the buoyant force of the water returns them to the bar screen. As a result of the impacts, oil is detached from the ice and it rises to the water level above the bar screen, from where it can be collected by using various methods.

Another objective of the invention is a device for the method described above. The device, comprising an inclined surface formed by a bar screen or a grating for forcing ice blocks under water, is attached to the side or bow of the ship and, when the ship is propelled, a movement that forces the ice downwards is generated. The device is characterized in that oil is separated from the ice blocks by vibrating the inclined surface formed by the bar screen. Vibrating is preferably effected in essentially the vertical direction.

BRIEF DESCRIPTION OF THE DRAWINGS

In the following, the invention is described with reference to the appended drawings in which:

FIG. 2 is a side view of a device according to the invention, and FIG. 3 shows a view of a bar screen according to the invention as viewed from below.

DESCRIPTION OF THE PREFERRED EMBODIMENTS

Figure 1:
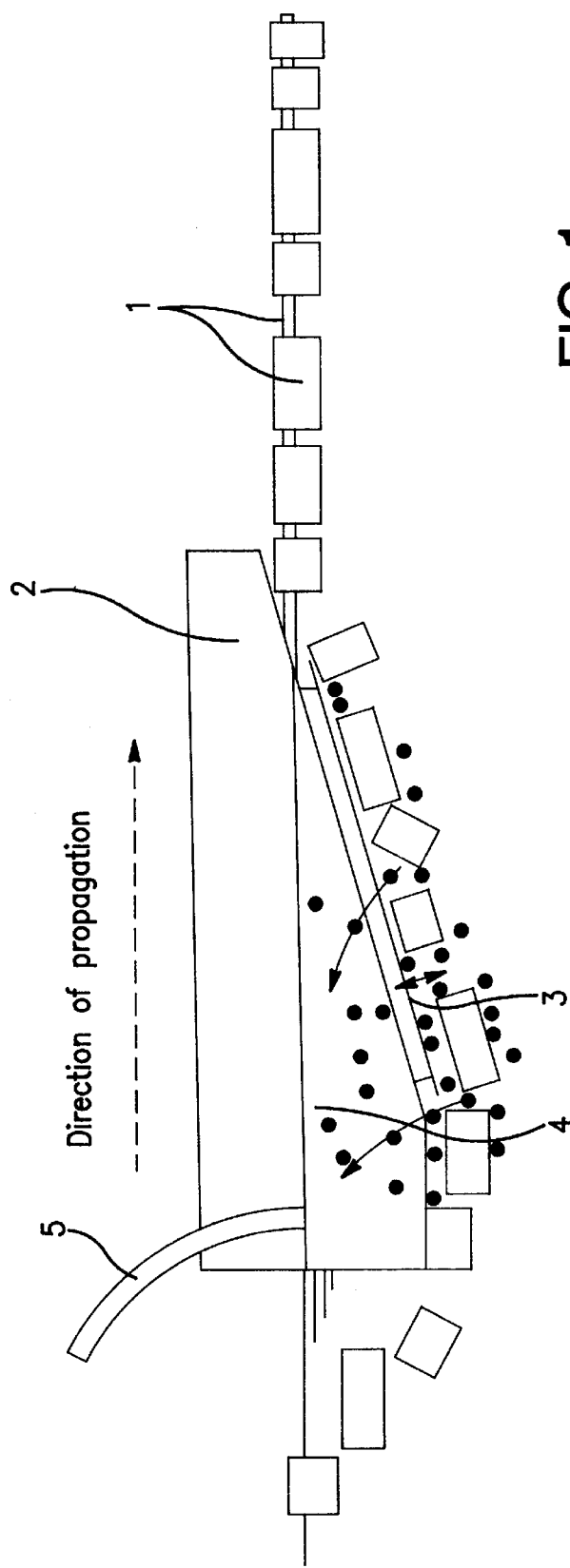
FIG. 1 shows the operating principle of the device according to the invention to separate oil from ice.

Device 2 according to the invention is either detachably or fixedly attached to the side or the bow of a vessel. Device 2 is preferably attached so that it can be detached, so that the vessel can also be used for other purposes. Furthermore, a preferred location is on the side of the ship, as the screw can see device 2, which improves security and no separate personnel are needed for the operation of device 2.

When the vessel moves forward, ice blocks 1, among which and attached to which there is oil, are forced under water along the inclined plane formed by bar screen 3 or a grating. Bar screen 3 is preferably inclined in such a way that, as a result of the ship's movement, the ice blocks slide along the inclined plane and the plane does not push them in front of it. A preferred inclination is, e.g., about 13 to 15 degrees. Bar screen 3 is preferably made of steel or other material that is suitable for the purpose.

Bar screen 3 is vibrated by a method known per se, for example, by eccentric mass or a crank mechanism. Bar screen 3 is moved in the vertical direction, pivoted axle 7 limiting the movement of its other end. The pivoted axle can be located on the leading or the trailing edge of device 2. Device 2 can also be moved back and forth by using linear guides, or vibration can have a rotating trajectory. Vibration is preferably effected essentially in the vertical direction but can also be carried out obliquely forward or backward.

In one embodiment according to the invention, illustrated by FIG. 2, pivoted axle 7 is located as far front as possible, so that there is a substantial amount of movement for bar screen 3 on the water level. A reciprocal movement is effected by push-pull rod 8 attached to the rear end of device 2, the rod being propelled by eccentric mass 6 rotated by a suitable, power-generating device, such as electric or hydraulic motor 9. The rotative velocity and the stroke of eccentric mass 6 can be adjusted. By adjusting the length of stroke, the amplitude of vibration can be changed and by adjusting the rotative velocity, the frequency of vibration can be changed.

The pounding movement of bar screen 3 drives ice blocks 1 downward and the buoyant force of the water puts them back in contact with the bar screen. As a consequence of the impacts, oil is detached from ice blocks 1 and rises to the surface of the water to collecting space 4 above bar screen 3, from where it can be transferred by using water flow 5, for example, to an oil separation unit that is preferably located inside the ship, so that it is not exposed to the stress caused by ice or coldness. On the market, there are various methods that are suitable for separation.

Bar screen 3 allows the water to freely drift above it, but holds the majority of ice blocks under it. Other grate-type plates can also be used, provided that they do not prevent the water from drifting.

Adjusting the direction of vibration so that it feeds ice under bar screen 3 can enhance the drifting of ice blocks 1 under bar screen 3. Furthermore, the drifting of ice blocks 1 under bar screen 3 can be enhanced, for example, by locating a paddle wheel or other active ice-feeding device in the front end of device 2.

Bar screen 3 can also be located in device 2 so that the part formed by bar screen 3 is horizontal so that the pitch angle is replaced by an S-upslope at the bow.

The method and the device according to the invention are especially viable on a fairway where there is passage broken for traffic or a passage caused by ship traffic. The device can also be attached to an icebreaker, so that the same vessel can first break the fast ice and after this or at the same time carry out oil separation from the ice by using the method according to the invention.

The description discloses some embodiments of the invention. However, the invention is not limited to only relate to these special cases but the various features of the invention can be modified within the extent of the appended claims without leaving the scope of the invention.

What is claimed is:

1. A method for separating oil from a mixture of ice blocks and water, comprising forcing the ice blocks (1) under the water along an inclined surface at least partly formed by a bar screen or a grating (3) attached to a vessel, while the vessel moves forward, wherein the oil is separated from the ice blocks (1) by vibrating, back and forth against the ice blocks (1), the inclined surface comprising the bar screen or the grating (3).

2. A method according to claim 1, wherein vibration is effected essentially in the vertical direction.

3. A method according to claim 1, wherein vibration is effected obliquely forward or obliquely backward.

4. A method according to claim 1, wherein vibration is caused by an eccentric mass (6) or a crank mechanism.

5. A method according to claim 1, wherein the oil that has come loose as a consequence of vibration is collected through a collecting space (4) to an oil separation unit, wherein the water and the oil are separated.

6. A device attached to a vessel for separating oil from a mixture of ice blocks and water, the device (2) comprising an inclined surface at least partly formed by a bar screen or a grating (3) for forcing the ice blocks (1) under the water while the vessel moves forward, wherein the device comprises a means for vibrating the inclined surface comprising the bar screen or the grating (3) back and forth against the ice blocks (1) for separating the oil from the ice blocks (1).

7. A device according to claim 6, wherein the device (2) is attached to the side or the bow of the vessel.

8. A device according to claim 6, wherein the device (2) is attached to the vessel so that it can be detached.

9. A device according to claim 6, wherein the device (2) is fixedly attached to the vessel.

10. A device according to claim 6, wherein the vessel is an icebreaker.

* * * * *